Patented July 12, 1949

2,476,132

UNITED STATES PATENT OFFICE 2,476,132

ORGANO-SILOXANE POLYMERS

Edgar C. Britton and Halbert C. White, Midland, Mich., assignors to The Dow Chemical Company, Midland, Mich., a corporation of Delaware No Drawing. Application July 28, 1945, Serial No. 607,663

4 Claims. (Cl. 260—448.2)

This invention relates to higher polymers of organo-siloxanes and to an improved method for their preparation from lower organo-siloxane polymers, i. e. from polymers having an average of less than ten silicon atoms in the molecule, by further polymerization of such lower polymers.

The polymerizations with which the invention is concerned are of the condensation type and, as is known, may involve the hydrolysis of siloxane groups with concurrent condensation of the resultant silicols, or may involve the splitting, e. g. by oxidation or hydrolysis, of organic radicals from organo-siloxane molecules with resultant formation of an oxygen bridge between atoms of silicon from which the organic radicals were displaced. Often both types of reactions occur simultaneously.

The organo-siloxanes with which the invention is concerned are compounds containing the radical:

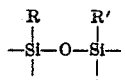

wherein R and R' represent organic radicals, e. g. alkyl, aryl, alicylic, aralkyl, or alkaryl radicals, etc., which are attached, through a carbon atom thereof, directly to a silicon atom. Organo-siloxanes of low molecular weight, i. e. having less than ten silicon atoms in the molecule, are produced as the principal products when an organo-silane which contains one or more of the radicals R and R' and also one or more readily hydrolyzable groups such as halogen atoms or alkoxy radicals is hydrolyzed with water. As is known, such hydrolysis is usually accompanied by a condensation of the hydrolysis products with resultant formation of organo-siloxanes of low molecular weight.

The organo-siloxanes thus formed may include either cyclic molecules or chain molecules and usually comprise both types. When a diorgano-substituted silicon halide (e. g. R$_2$SiCl$_2$, wherein the symbols R represent the same or different organic radicals) is hydrolyzed with concurrent condensation, many of the distillable low polymers are cyclic in structure, e. g. (R$_2$SiO)$_3$, and because of their volatility and resistance to further polymerization are limited in their fields of application. When the material subjected to hydrolysis contains a considerable quantity of tri-organo-substituted silicon halides, R$_3$SiCl, the size of straight chain polymers is limited by the end-blocking group (—SiR$_3$).

Examples of lower polymer organo-siloxanes formed in the conventional manner just described are the products obtained by the hydrolysis of dimethyl silicon dichloride, dimethyl dimethoxy - silane, diphenyl silicon dichloride, phenyl methyl silicon dichloride, phenyl ethyl silicon dibromide, etc. Such lower polymer organo-siloxanes have heretofore been, and in the present invention are, employed as starting materials for the production of organo-siloxanes which are of higher molecular weight and which because of their greater viscosity or their resinous properties are adapted to a wide variety of uses, e. g. as coating agents, dielectric materials, etc. In many instances the higher polymers may, by a heat treatment, be converted into hard resins which are resistant to the action of organic solvents and which serve as excellent coating materials, e. g. for electric wires, panels, etc. However, the utility of the higher polymers is dependent upon discontinuance of the polymerization reaction at a point at which the product has a viscosity and average molecular weight such as to render it suitable for the intended purpose, i. e. if the polymerization is permitted to proceed unchecked, the polymeric product tends to vary in quality from one batch to the next and in many instances solid, solvent-resistant polymeric masses are obtained which cannot readily be fabricated into useful forms.

Although methods are known for converting organo-siloxanes of low molecular weight into products of higher molecular weight, the known methods are inconvenient and do not permit ready control so as to assure discontinuance of the reaction at a desired point. For instance, it is known that the organo-siloxanes of low molecular weight may be further polymerized by heating the same together with an aqueous mineral acid such as hydrochloric or sulphuric acid at temperatures in the order of 180° C. and higher. It is also known that organo-siloxanes which contain alkyl radicals may be heated in the presence of moist air or oxygen to effect a further condensation of the same through the splitting out of alkyl groups from the organo-siloxanes with the concurrent formation of aldehydes. In either procedure, it is frequently difficult to arrest the process of polymerization at the point of optimum viscosity due to the rapid rate at which the viscosity changes as the molecular size of the polymer increases. It is also recognized that processes which involve the use of corrosive materials are not very satisfactory at higher operating temperatures, inasmuch as the usual corrosion-resistant apparatus, e. g. glass- or enamel-lined tanks or kettles, are not satisfactorily heat-resistant.

We have discovered that aqueous hydrobromic acid solutions are catalysts which permit the further polymerization of the lower organo-siloxane polymers and that by employing such catalyst in conjunction with a solvent for the siloxane the reaction may be carried out readily at a moderately elevated temperature and may be controlled so as to discontinue the reaction at the desired point. More specifically we have found that when a low polymer organo-siloxane is suspended or dissolved in an inert organic solvent, e. g. a hydrocarbon, and the resultant mixture or solution is subjected to the action of aqueous hydrobromic acid solution while heating to a temperature at which the hydrogen bromide refluxes, further polymerization of the low polymer organo-siloxane takes place at temperatures in the order of from 100 to 120° C., and above, i. e. at temperatures which are sufficiently low to permit operation at atmospheric pressure or thereabout with the use of standard corrosion-resistant apparatus.

The conjoint use of an organic diluent with the aqueous hydrobromic acid solution apparently retards the rate of reaction so as to make the polymerization more readily controllable than when no diluent is employed. Isopropyl benzene is preferred as the solvent, although any hydrocarbon or ketone, etc., which is a solvent for the organo-siloxane may be employed. Examples of such other solvents are chlorobenzene, ethylbenzene, xylene, dipropyl ketone, and fractions of petroleum boiling at temperatures within the range of from 120° to 140° C. The diluents which are usually employed are volatile compounds that distill, e. g. as azeotropes, together with the aqueous hydrobromic acid and thus aid in removal of the latter after completion of the polymerization. In general, the more organic diluent there is present in the polymerization mixture, the less rapidly does the polymerization proceed. The solvent and organo-siloxane are combined so as to make a solution, or a substantially homogeneous suspension, containing from 50 to 85, and preferably from 65 to 76, per cent by weight of said organo-siloxane. When the solvent and organo-siloxane are employed in the preferred proportions just stated, the proportion of organic diluent, after adding the aqueous hydrobromic acid solution, usually amounts to from 5 to 15 per cent of the weight of the entire polymerization mixture. However, much greater or smaller proportions of the solvent may be used if desired.

To the suspension or solution of organo-siloxane described above is added an aqueous hydrobromic acid solution containing at least 35 per cent and preferably from 40 to 50 per cent by weight of HBr. From 0.5 to 1.5 parts by weight of the aqueous acid solution is usually employed for each part of the organo-siloxane solution. We have found that the employment of an aqueous hydrobromic acid solution of the above-stated concentration eliminates many operating difficulties, such as foaming, which are encountered when concentrated hydrobromic acid is used for the polymerization of organo-siloxanes, even in the presence of an organic diluent.

The resultant mixture of organo-siloxane, organic solvent, hydrobromic acid and water is then heated with stirring to a reflux temperature preferably of from 100 to 120° C. This temperature is maintained until the viscosity of the mixture reaches a predetermined value which is indicative of the formation of a polymeric product having the desired properties. The hydrogen bromide is then removed by distilling off the mixture of hydrogen bromide and organic solvent. The polymerization product is subsequently washed with water to remove final traces of acid.

The following examples are illustrative of a preferred mode of practicing the invention, but are not to be construed as limiting its scope.

*Example 1*

80 grams of phenyl ethyl silicone trimer, $(C_6H_5C_2H_5SiO)_3$ B. P. 168–170° C. at 0.25 mm. pressure, were dissolved in 20 grams of isopropylbenzene. The resulting solution had a viscosity of 10.4 centistokes. To this solution was added 100 grams of an aqueous hydrobromic acid solution of 48 per cent concentration. The mixture was heated for 36 hours with stirring at temperatures of from 120 to 103° C. under a reflux of the acid solution. During the reaction benzene, in amount corresponding to 60.6 per cent of the phenyl radicals originally present in the trimer, was formed and was periodically withdrawn as a low-boiling overhead fraction. After completing the polymerization reaction, hydrobromic acid was distilled off as an azeotrope with isopropylbenzene. The residual viscous resinous product was washed several times with water, and then diluted with solvent to a concentration of 27.4 per cent solids. The viscosity of this solution was 700 centistrokes.

*Example 2*

A mixture of methyl phenyl siloxane polymers was prepared by the hydrolysis of dichloromethylphenyl silane, $CH_3C_6H_5SiCl_2$, with concurrent condensation of the hydrolysis products. A liquid was obtained, which had a viscosity of 303 centistokes at 25° C. Analysis showed the methyl:phenyl:silicon ratio to be 1:1:1, and the average molecular weight, 650. To 80 grams of this liquid were added 20 grams of isopropylbenzene. The mixture was treated with 100 grams of aqueous hydrobromic acid of 48 per cent concentration and refluxed for 8 hours at temperatures of from 125 to 110° C. Hydrobromic acid and isopropylbenzene were then distilled from the polymerization product. A 77.8 per cent solution of the product in isopropylbenzene had a viscosity of approximately 430 centistokes, at 25° C. Analysis of the final product showed the methyl:phenyl:silicon ratio to be 9.8:7.0:10, and the average molecular weight, 1125.

*Example 3*

The procedure described in Example 1 was repeated, except that $[(CH_3)_2SiO]_6$ was used as the starting material. Prior to the treatment with hydrobromic acid, the viscosity of the organo-siloxane solution of 80 per cent concentration was 2.7 centistokes. After refluxing for 40 hours at 120–123° C., the HBr and isopropylbenzene were distilled off. The residual product was diluted to 80 per cent solids with isopropylbenzene. The resultant solution had a viscosity of 95 centistokes.

*Example 4*

A solution of 80 grams of hexamethyl cyclotrisiloxane, $[(CH_3)_2SiO]_3$, in 20 grams of isopropylbenzene was prepared. The viscosity of the solution was approximately 2.5 centistokes. By procedure similar to that described in Example 1 this solution was treated with 100 grams of an aqueous 48 per cent HBr solution and the mixture was heated for 8 hours at a temperature of 122-124° C., after which the HBr and isopropylbenzene were removed. An isopropylbenzene solution containing 37.5 per cent by weight of the resultant polymer had a viscosity of 1450 centistokes. A molecular weight determination indicated an average of 435 silicon atoms per molecule. The methyl:silicon ratio of the product 1.99:1.

Other modes of applying the invention may be employed, change being made as regards the method herein disclosed provided the step or steps stated by any of the following claims or the equivalent of the stated step or steps be employed.

We therefore particularly point out and distinctly claim as our invention:

1. The method which comprises heating a liquid mixture of aqueous hydrobromic acid and an organo-siloxane that is free of unsaturated aliphatic radicals, contains an average of less than 10 silicon atoms in the molecule, and contains, as the organic portions of the molecule, an average of at least 1, and less than 3, hydrocarbon radicals per atom of silicon, while heating the same at approximately atmospheric pressure and at temperatures between 100° and 125° C. together with an organic diluent that tends to distill at atmospheric pressure together with the hydrobromic acid.

2. The method which comprises heating a liquid mixture of aqueous hydrobromic acid and a cyclic organo-siloxane that is free of unsaturated aliphatic radicals, contains an average of less than 10 silicon atoms in the molecule, and contains, as the organic portions of the molecule, an average of at least 1, and less than 3, hydrocarbon radicals per atom of silicon, while heating the same at approximately atmospheric pressure and at temperatures between 100° and 125° C. together with an organic diluent that tends to distill at atmospheric pressure together with the hydrobromic acid, and thereafter distilling a mixture of the hydrobromic acid and the organic diluent from the resultant polymerization product.

3. A method, as described in claim 2, wherein the mixture subjected to heating comprises from 40 to 50 per cent by weight of the cyclic organosiloxane containing an average of less than 10 silicon atoms in the molecule, from 15 to 25 per cent of HBr, from 5 to 15 per cent of the organic diluent, and from 20 to 30 per cent of water.

4. A method, as described in claim 3, wherein the cyclic organo-siloxane starting material is a cyclic polymer of phenylethyl siloxane.

EDGAR C. BRITTON.
HALBERT C. WHITE.

REFERENCES CITED

The following references are of record in the file of this patent:

UNITED STATES PATENTS

| Number | Name | Date |
|---|---|---|
| 2,371,050 | Hyde | Mar. 6, 1945 |
| 2,371,068 | Rochow | Mar. 6, 1945 |
| 2,398,672 | Sauer | Apr. 16, 1946 |